Feb. 25, 1958 J. W. STINEMAN, JR., ET AL 2,825,015

CONTACTING ARRANGEMENT FOR SEMICONDUCTOR DEVICE, AND METHOD FOR THE FABRICATION THEREOF

Filed April 12, 1954

INVENTORS
SAMUEL A. ROBINSON
JACOB W. STINEMAN JR.
BY
Dean V. Hazeltine
ATTORNEY 2,825,015

CONTACTING ARRANGEMENT FOR SEMICONDUCTOR DEVICE AND METHOD FOR THE FABRICATION THEREOF

Jacob W. Stineman, Jr., Villanova, and Samuel A. Robinson, Lansdale, Pa., assignors to Philco Corporation, Philadelphia, Pa., a corporation of Pennsylvania Application April 12, 1954, Serial No. 422,352

14 Claims. (Cl. 317—236)

The invention relates to improvements in semiconductive devices and in methods for their manufacture, particularly where the device utilizes a spring-tensioned contact member of small cross-sectional dimensions.

A variety of semiconductor devices are now known in which a semiconductive structure is contacted by an element having relatively small cross-sectional dimensions, and in which the position and/or the pressure of the contacting element upon the semiconductive structure is important to the proper operation of the device. An example of such devices is the low noise-figure germanium diode, with respect to which the present invention will be described in detail hereinafter. In one form of this device, a pointed metallic whisker having a diameter of 1¾ mils is applied gently against a prepared surface of a germanium crystal, and an aging current is passed through the contact between whisker and germanium to "age" the material under the point, thereby to provide the desired rectifying characteristics. Typically, the diameter of the contact between whisker point and crystal may be of the order of 0.2 mil, and the aged area of the crystal surface beneath the whisker is of comparable dimensions. While this structure is especial well adapted for providing a low-noise figure in the resultant diode, even slight movement of the whisker point away from the tiny aged area of the crystal surface is nearly certain to produce severe adverse effects upon the electrical performance of the unit. Furthermore, this type of diode is particularly susceptible to such movement, since the whisker is so fine and the pressure with which it bears against the crystal surface so slight.

In our copending application Serial No. 306,446, filed August 26, 1952, now Patent No. 2,751,529, and entitled "Electrical System," there is described a structure for stabilizing a low-noise crystal diode of the type described briefly hereinabove, by rigidly bonding the whisker point to the crystal surface with a minuscle droplet of low-shrinkage cement. Although satisfactory for many important applications, such a method by which a cement is applied to the point of contact between whisker and crystal has the following drawbacks. First, since relatively large amounts of heat are generated at the contact point between whisker and semiconductor during the aging process, application of the cement material is usually delayed until after aging has been performed. Great care must therefore be taken in applying the tiny droplet of cement, lest accidental jarring move the whisker point from the tiny aged portion of the semiconductor under it. While suitable techniques for accomplishing accurate application of the cement droplet have been developed, the extreme care required contributes substantially to the expense of the process. Secondly, since the cement material directly surrounds the point of contact, any influences which affect the cement after fabrication also directly affect the nature of the contact. Thus, any shrinkage, expansion or deterioration of the cement material, or any absorption of moisture by it, may be expected to produce corresponding immediate and direct effects upon the contact and hence upon the operation of the complete device.

Although of special importance in the case of the low-noise diode described hereinabove, the problem of maintaining relatively fine filamentary or small-area electrodes in contact with semiconductive structures arises also in connection with other devices such as the point-contact transistor, or as is described hereinafter in detail, in making contact to the relatively small emitter and collector contacts in the surface-barrier type of transistor described in the copending application Serial No. 395,823, of Williams and Tiley, entitled "Electrical Device," filed December 2, 1953, now Patent No. 2,731,062, and of common assignee.

Accordingly, it is an object of our invention to provide an improved construction for semiconductive devices in which a semiconductive structure is contacted by a critically-applied, resilient contacting member.

Another object is to provide such a device in which the contacting element is of small cross-sectional dimensions, and bears gently against the surface of the semiconductive structure.

Another object is to provide a low-noise crystal diode of improved stability and life.

Still another object is to provide a transistor having an improved contacting arrangement.

In accordance with the invention, our improved device utilizes a resilient contacting member held against the structure to be contacted by means of a droplet of cementitious material, which bonds the contacting member to the semiconductive structure at a point adjacent to but spaced from the contact region. Preferably the droplet is applied while other means hold the contacting member, with the desired pressure, against the structure to be contacted. Thus, in the low-noise diode described in detail hereinafter, the contacting element may be a fine filamentary whisker having a sharpened point in contact with the semiconductive surface, and provided with a suitable bend or elbow therein whereby a portion of the whisker is caused to dispose itself near the semiconductive surface at a point spaced from the point of contact thereto. A globule of suitable cement then rigidly bonds the semiconductive body to the whisker at a point spaced from the point of contact and preferably at the elbow where the whisker approaches most closely the semiconductive surface.

With this novel arrangement, the contact is highly stable and resistant to mechanical shock, while at the same time the point of contact between whisker and crystal is free of cementitious material and hence can be aged after the globule of cement has been applied and has hardened. The position of the whisker upon the crystal therefore does not become critical until the physical assembly and electrical aging of the unit have been completed. As a result, less care in assembly is required, the fabrication process is substantially simplified, and the cost of the resultant device is thereby reduced. Also, since the cement provides a rigid bond between the whisker and the semiconductive structure at a point spaced from the contact point, the possibilities of differential temperature effects causing relative motion of the whisker support and the crystal support are minimized. Furthermore, even if the globule of cement should undergo some contraction, expansion or deterioration due to humidity, for example, the substantial resilience of the whisker region between the globule and the contact point mitigates the effect of such forces upon the contact between whisker and crystal. Finally, even if there should be some motion of the whisker point upon the surface after final fabrication of the unit, the location of the bonding cement at a point spaced from the contact point permits rejuvenation of the device by re-aging.

In the case of the transistor, a similar technique may be applied to the emitter and collector contacting elements. Thus the contacting elements may be spring-tensioned against the tiny emitter and collector electrodes with a pressure great enough to provide positive contact but not so great as to injure the delicate structure. Next, a globule of suitable cement may be applied to bond each contacting element to the semiconductive structure at a point spaced from the contact point but sufficiently close thereto to reduce substantially the mass of the free portion of the contacting element and hence to reduce the sensitivity of the contacts to mechanical shock. The contacting elements will then be held firmly against the emitter and collector contacts with the proper pressure and in the proper locations.

Other objects and features of the invention will be more fully appreciated from a consideration of the following detailed description taken in connection with the accompanying drawings, in which.

Figure 1:
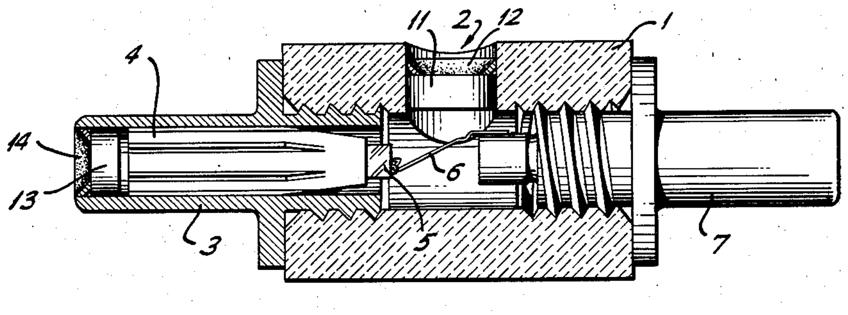
Figure 1 is a sectional view of a low-noise point-contact crystal rectifier assembly embodying the structure of the invention.

Referring now to Figure 1 in detail, the crystal rectifier cartridge assembly represented therein is of a symmetrical, coaxial type suitable for use as a rectifier or mixer in the conversion of radio-frequency signals of approximately 10,000 megacycles per second, to intermediate frequency signals of approximately 30 megacycles per second, for example. This cartridge may comprise an insulating cartridge case 1 in the form of a hollow ceramic cylinder threaded internally at each end, and having a circular opening 2 through one wall thereof. Into one end of cartridge case 1 there may be inserted threaded plug member 3, which is hollow so as to accommodate the crystal-bearing, splined rod member 4 press-fitted into it. The crystal member 5 may be soldered to rod 4, and is point-contacted by means of a whisker 6 composed of titanium, welded or otherwise fastened to a whisker-bearing plug member 7 threaded into the opposite end of cartridge case 1. Plug members 3 and 7 are preferably sealed rigidly in position by means of a suitable cement, such as basing cement or shellac, applied along the threads.

For best low noise performance, we prefer to utilize a crystal member 5 which is approximately 99.78% germanium, 0.2% antimony, and 0.02% bismuth by weight, although other compositions may also be employed. The interior space within ceramic case 1 and between plug members 3 and 7 may be filled with a dry, clean gas such as air or argon. To contain this gas, opening 2 may be sealed by means of a resilient cylindrical plug 11 which fits tightly into opening 2. Preferably this plug is of neoprene and a sealing compound 12 such as basing cement is placed around the periphery of the external surface of plug 11 to complete the seal. The air passages created by the splining of rod member 4 are also appropriately sealed by means of another neoprene plug 13 and a suitable sealing compound 14.

Figure 2:
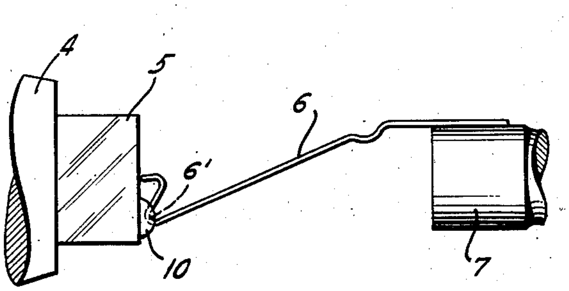
Figure 2 is a fragmentary sectional view of the diode of Figure 1, showing in more detail the whisker structure and cementing arrangement embodying the invention.

As is shown more clearly in Figure 2, the whisker 6 is preferably an exceedingly fine filament of titanium, which may be in the form of a wire of circular cross-section having a diameter of 0.00175 inch, and which has been sharpened to an extremely fine point at the end which makes contact with the crystal surface. Because of the light pressure with which the whisker bears against the crystal surface, this sharp point is blunted but slightly by its contact with the surface. A small area of contact having a diameter of about two ten-thousandths of an inch is therefore provided. This small contact area contributes to the characteristically low noise figure of our rectifier, but renders the whisker readily movable in response to shock and vibration in the absence of the provisions of our invention.

Whisker 6 is provided with an elbow 6' whereby the whisker 6 is caused to approach the crystal surface, without touching it, at a point displaced from the point of contact. Typically the elbow approaches the crystal surface at a point spaced from the point of contact by about 12 mils. A globule 10 of cement bonds the elbow region 6' of whisker 6 to crystal 5. While the globule 10 need not be of extremely small size, it is preferably sufficiently small to leave an appreciable space, several mils for example, between itself and the point of contact between whisker and crystal. Furthermore, it is preferably sufficiently spaced from the point of contact to provide a whisker region between globule 10 and the contact point of sufficient length to be somewhat resilient, thereby to absorb any residual stresses which subsequent expansion or contraction of the globule 10 may tend to exert upon the crystal contact point.

A suitable material for the cement is one of the epoxy or ethoxy resins, such as that known as Hysol 6020 and manuafctured by Houghton Laboratories. The cement utilized should possess low shrinkage on setting and curing, low temperature coefficient of expansion, and is preferably non-hygroscopic and provides rigid bonds to metals and semi-conductors. For the present purpose we prefer to utilize a mixture of the above-mentioned Hysol 6020 with nearly an equal amount by weight of cerium oxide or of silica, to which mixture a suitable hardener is added just prior to application.

To fabricate the low-noise crystal diodes shown in Figures 1 and 2, the whisker 6 is soldered or welded to stud 7 and appropriately bent and crimped substantially as shown. The threads of whisker-bearing plug member 7 and of plug member 3 are coated with a suitable cement, and the plug members screwed into opposite ends of ceramic case 1. After the cement has dried, crystal-bearing rod 4 is pushed into the interior of plug member 3 until the point of whisker 6 makes contact with the surface of crystal 5, after which the crystal-bearing rod is advanced an additional two-thousandths of an inch. A globule of the above-specified epoxy cement is then picked up by any suitable means, such as a pair of sharpened tweezers or a fine wire, and applied to the elbow of whisker 6. This globule should be sufficiently large to contact and to surround the whisker 6 near the elbow 6' while also making substantial contact to the surface of the crystal, but not so large as to extend to the point of contact between the whisker and crystal surface. Typically, the globule will have a diameter of about 5 mils. After application, the globule is allowed to harden and to set at room temperature for a period of about 36 hours and is then cured by baking at a temperature of about 125° C. for about 16 hours, after which an appropriate aging current may be passed through whisker 6 in conventional manner. The crystal diode is then filled with a suitable dry gas and the sealing plugs 11 and 13 cemented in place. The resultant diode is then characterized by an extremely low noise figure while at the same time being highly resistant to mechanical and chemical deteriorating forces.

It is also a feature of the invention that, even should the whisker point move slightly after fabrication, it will normally be possible to revive the unit by passing the appropriate aging current through the whisker again in the forward direction, since the globule of cement 10 is not thereby unduly heated.

Figure 3:
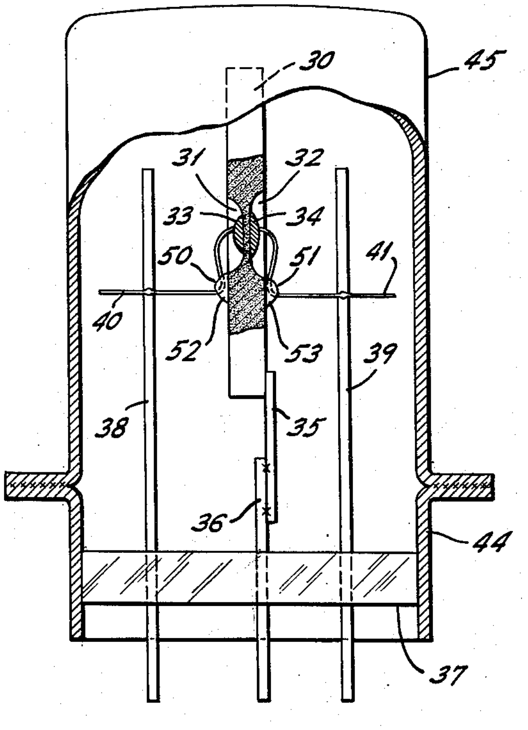
Figure 3 is an elevational view, partly broken away, of a surface-barrier transistor embodying the invention in another form.

Figure 3 illustrates the application of the invention to the attachment of leads in the surface-barrier transistor described in the aforementioned copending application Serial No. 395,823. As is described in detail in that application, the surface-barrier transistor typically comprises a germanium wafer 30 having a pair of opposed depressions 31 and 32 on opposite faces thereof so as to provide a relatively thin partition of germanium material between their bottoms, and metallic deposits 33 and 34 confined to the substantially flat bottom portions of depressions 31 and 32 respectively. Germanium wafer 30 then serves as the base element of a transistor, while metallic deposits 33 and 34 may comprise the emitter and collector electrodes respectively. This structure may suitably be supported by means of the base tab 35 soldered to wafer 30, and by support pin 36 which conveniently is spot-welded to the base tab 35. In a typical structure the base pin 36 may pass through and be supported by a base 37 in the form of a glass disc.

Pins 38 and 39, passing through the same base 37, provide connection to the emitter and collector contacting elements 40 and 41 respectively, the nature of which is described in detail hereinafter. In a commercial unit, a flanged ring member 44 of a suitable metal may tightly surround the glass base 37, and a flanged cylindrical cap member 45 may enclose the active elements of the transistor. Ring member 44 and cap member 45 are appropriately held together and sealed by means of continuous welds between the flanges of the respective members. Appropriate protective and heat-conducting potting compounds (not shown) may be utilized to fill the interior of the cap 45.

Considering now the requirements for the contacting elements 40 and 41, it will be appreciated that the semiconductive material between metallic deposits 33 and 34 is extremely thin, and hence fragile. Typically the semiconductor at this point may be about 0.0002 inch in thickness and, although the metal deposits thereon tend to provide additional strength, it is desirable to utilize no more metal than is essential for electrical operation. However, it is also desirable to utilize a contacting arrangement which is not unduly sensitive to mechanical shock or vibration, since such sensitivity would interfere greatly with the electrical operation. It is therefore desirable in this instance, as in the case of the low-noise diode described hereinbefore, to provide a gentle but reliable contact to the semiconductive structure—in this instance to the portion of the crystal surface upon which the emitter and collector electrodes have been deposited.

Accordingly whiskers 40 and 41 may be made of relatively fine wire of about 2-mil diameter platinum +10% ruthenium alloy, and are preferably bent into the shape shown to provide an elbow region for each whisker relatively remote from the point of contact to the corresponding electrode, at which elbows the contacting elements may be cemented to the crystal surface. Thus contacting element 40 is provided with an elbow region 50 and is spot welded to emitter support 38, while contacting element 41 is provided with an elbow 51 between the point of spot welding to support 39 and the point of contact to electrode 34. It is understood that the contacting elements 40 and 41 are spotwelded to support pins 38 and 39 in a position to provide the appropriate contact pressure between the contacting elements and the respective electrodes 33 and 34.

Globules of cement 52 and 53 are then applied to opposite surfaces of wafer 30 at such points as also to contact elbow regions 50 and 51 respectively. These globules may suitably be composed of the cerium-oxide or silica filled epoxy cement described hereinbefore, and may be of dimensions comparable to those employed in the low-noise diode described previously. In this instance care is also taken that the globules 32 and 33 do not extend into the region where the contacts to the electrodes are made. With this arrangement, contacting elements 40 and 41 provide the desired gentle yet firm contact to electrodes 33 and 34 respectively, and at the same time are relatively immune to any minor variations in the properties of globules 52 and 53 which may be caused by thermal expansion or by moisture absorption for example.

Although the invention has been described with particular reference to specific embodiments thereof, it will be understood that it is applicable to any of a wide variety of semiconductive devices and may be so applied without departing from the spirit of the invention. Thus, for example, while in each instance the contacting element is shown cemented to the surface of the same crystal to which contact is made, it will be apparent that it may also be applied to any closely adjacent surface which is in fixed geometric relation to the crystal surface. Further, although the contacting element has been shown supported near one end by means other than the globule of cement, it will be understood that the function of this support is principally to hold the contacting elements while the cement is applied and hardened, and that in many cases the portion of the contacting element between the hardened globule and the external support may be cut away if desired. In view of the foregoing teachings such equivalent structures will readily occur to one skilled in the art.

We claim:

1. Apparatus for providing gentle yet stable spring contact to a predetermined, small region of an integral semiconductive structure, comprising a resilient, filamentary, contacting member fixedly supported at one point and having one end thereof in light spring contact with said predetermined region of said structure, and a body of cementitious material bonding said member to said structure at a point intermediate said point of support and said point of contact, and adjacent to but spaced from said point of contact.

2. Apparatus in accordance with claim 1, in which said contacting member has a portion extending along said semiconductive structure, and said body bonds said portion of said contacting member to said semiconductive structure.

3. Apparatus in accordance with claim 1, in which said contacting member comprises a conductive element having a portion extending along said semiconductive structure and through said body of cementitious material, without touching said structure.

4. Apparatus in accordance with claim 1, in which said resilient contacting member comprises a conductive element having an elbow approaching said semiconductive structure at a point adjacent but spaced from said point of contact, said body bonding said elbow to said semiconductive structure.

5. In a spring-contacted semiconductive device, a body of semiconductive material, a resilient, filamentary, conductive member in light spring-contact with a predetermined point on said body and fixedly held at a point remote from said point of contact, and a body of cementitious material located at a point intermediate said remote point and said point of contact, and adjacent said point of contact but spaced therefrom for holding said member in contact with said semiconductive body.

6. The device of claim 5, in which said resilient member is characterized by a first portion extending substantially normally to a surface of said semiconductive body for providing small area contact to said semiconductive body, and a second portion extending generally along said surface and contacted by said body of cementitious material.

7. A point-contact semiconductive device, comprising: a semiconductive body; a filamentary electrode bearing gently against a surface of said body to provide a point contact; support means for supporting a portion of said electrode remote from said surface; and a body of substantially non-conductive cementitious material bonding a part of said electrode intermediate the ends thereof, to a portion of said surface adjacent and spaced from said point contact.

8. The diode of claim 7, in which said electrode is provided with an elbow adjacent said semiconductive body, to which said body of cementitious material makes contact.

9. Apparatus for providing stable contact to a small prescribed metallic region of an integral semiconductive device, comprising: a resilient contacting element making light spring-contact with said region and fixedly held at a point remote from said region; and a globule of cementitious material situated intermediate said remote point and said region of contact, and adjacent to but spaced from said contact, for holding said element in fixed relation to said device.

10. The apparatus of claim 9, in which said metallic region comprises a rectifying area-contact.

11. Apparatus for contacting the emitter or collector electrode of a transistor device of the type having a base of semiconductive material and in which said electrode is of the area type, comprising a resilient, filamentary conductive element in light spring-contact with said electrode and fixedly held at a point thereof remote from said electrode, and a globule of substantially non-conductive cementitious material contacting said conductive element at a point intermediate said remote point and said electrode, contacting said semiconductive base at a point adjacent to but spaced from said electrode, and fixedly bonding said element to said base.

12. The method of providing light but stable spring-contact between a semiconductive body and a fine, filamentary contacting electrode, said method comprising the steps of positioning said electrode so as to contact said body at a predetermined point and to extend along said body at least in part, applying the desired pressure between said electrode and said body, and applying a globule of cementitious material in a position to contact said electrode and said body at a point adjacent to but spaced from said point of contact, thereby to hold said electrode in stable contact with said body.

13. A rectifying element of the coaxial type, comprising a body of crystalline semiconductive material, a metallic filament making resilient point-contact with a portion of said body, said filament extending generally perpendicular to the contacted surface of said body but having a region of substantially parallel extension in the vicinity of said point-contact, and a droplet of cementitious material of low electrical conductivity holding said region of said filament in fixed position with respect to said body.

14. Apparatus for providing stable spring-contact to a predetermined, small region of a semiconductive body, comprising a resilient, filamentary, contacting member in spring-contact with said body, and a body of cementitious material located adjacent said region of contact but spaced therefrom and bonding said member to said semiconductive body, the portion of said contacting member between said body of cementitious material and said region of contact being deformed by pressure of said member against said body.

References Cited in the file of this patent

UNITED STATES PATENTS

| | | |
|---|---|---|
| 1,319,804 | Sjostrom | Oct. 28, 1919 |
| 2,475,940 | Brittain | July 12, 1949 |
| 2,560,579 | Kock et al. | July 17, 1951 |
| 2,753,497 | Jenkins et al. | July 3, 1956 |
| 2,773,225 | Jones | Dec. 4, 1956 |

FOREIGN PATENTS

| | | |
|---|---|---|
| 514,627 | Belgium | Apr. 4, 1953 |